(12) United States Patent
Paulussen (10) Patent No.: US 9,991,952 B2
(45) Date of Patent: Jun. 5, 2018

(54) OPTICAL SIGNAL MONITORING

(71) Applicants: Allied Telesis Holdings Kabushiki Kaisha, Tokyo (JP); Allied Telesis, Inc., San Jose, CA (US)

(72) Inventor: Luuk Paulussen, Christchurch (NZ)

(73) Assignee: ALLIED TELESIS HOLDINGS KABUSHIKI KAISHA, Tokyo (JP)

( * ) Notice: Subject to any disclaimer, the term of this patent is extended or adjusted under 35 U.S.C. 154(b) by 325 days.

(21) Appl. No.: 14/842,702

(22) Filed: Sep. 1, 2015

(65) Prior Publication Data

US 2017/0063450 A1    Mar. 2, 2017

(51) Int. Cl.
*H04B 10/08*    (2006.01)
*H04B 10/07*    (2013.01)
*H04B 10/079*    (2013.01)

(52) U.S. Cl.
CPC ..... *H04B 10/0705* (2013.01); *H04B 10/0793* (2013.01); *H04B 10/07955* (2013.01)

(58) Field of Classification Search
CPC .......... H04B 10/07955; H04B 10/0795; H04B 10/0793; H04B 10/0771; H04B 10/40
USPC ...... 398/33, 38, 10.12, 13, 17, 19, 135, 136, 398/158, 159, 162, 25, 26, 27; 356/73.1
See application file for complete search history.

(56) References Cited

U.S. PATENT DOCUMENTS

| | | | |
|---|---|---|---|
| 7,231,145 B2* | 6/2007 | Gerstel | H04B 10/07 398/16 |
| 2002/0101631 A1 | 8/2002 | Gerstel et al. | |
| 2012/0087648 A1* | 4/2012 | Gao | H04J 14/028 398/1 |

FOREIGN PATENT DOCUMENTS

WO    2008150754 A1    12/2008

OTHER PUBLICATIONS

European Search Report for European Patent Application No. 16186876.5 dated Dec. 5, 2016.

* cited by examiner

*Primary Examiner* — Hanh Phan
(74) *Attorney, Agent, or Firm* — Michael Zarrabian; Brooks Acordia IP Law, PC (57) ABSTRACT

Some embodiments provide a device that includes an optical module manager, an optical power manager, and a notification manager. The optical module manager may be configured to poll an optical module coupled to the device for received optical power values. The optical module manager may be further configured to receive a received optical power value. The optical power manager may be configured to determine a baseline power value based on the polling of the optical module. The notification manager may be configured to generate a notification when the received optical power value differs from, e.g., falls below, the baseline power value by a threshold amount. The notification indicates that a tampering of optical signals transmitted to the device may have occurred.

23 Claims, 7 Drawing Sheets

OPTICAL SIGNAL MONITORING

BACKGROUND

Many network devices communicate with other devices in a network through optical signals via fiber-optic cables. The data in such networks may be at risk of unwanted access through tampering and/or tapping of the fiber-optic cables. To combat such tampering and/or tapping, systems exist that use additional fiber to detect movement of the cable, or insert a tap into the cable to measure power attenuation. However, these systems are expensive and require extra equipments to perform the monitoring tasks.

SUMMARY

Accordingly, a need has arisen for network devices that incorporate detection of tampering and/or tapping of fiber optic cables in the normal operation of the network, without using additional equipment or additional non-data-carrying fibers. Based on the available information, e.g., received optical power levels, these network devices may determine whether tampering has occurred. The system may respond, e.g., send a message, shut down the affected port, etc., in response to a determination that a tampering has occurred. Further, there is a need for such network devices to detect tampering and/or tapping of fiber optic cables based on the received optical power values and transmitted optical power values communicated by a remote device.

In some embodiments, a device includes an optical module manager, an optical power manager, and a notification manager. The optical module manager may be configured to poll an optical module coupled to the device for received optical power values. The optical module manager may be further configured to receive an optical power value. The optical power manager may be configured to determine a baseline power value based on the polling of the optical module. The notification manager may be configured to generate a notification when the received optical power value differs from, e.g. falls below, the baseline power value by a threshold amount. The notification may indicate that a tampering of optical signals transmitted to the device has occurred.

In some embodiments, the optical power manager may be further configured to determine the baseline power value based on an average of a plurality of recent received optical power values. In some embodiments, the optical power manager may be further configured to determine the baseline power value by using a specified power value as the baseline power value. In some embodiments, the optical power manager may be configured to determine a maximum achievable sensitivity for a link from the received optical power values. It is appreciated that the maximum sensitivity may be determined using the spread of measured values. It is appreciated that the optical module may be a small form-factor pluggable (SFP) transceiver. It is also appreciated that the SFP transceiver may be a digital diagnostic monitoring (DDM)-capable SFP transceiver. In some embodiments, the threshold amount may be a specified power value amount. In some embodiments, the threshold amount may be a function of the baseline power value, e.g., a percentage of the baseline power value. It is appreciated that other optical modules may be used, e.g., SFP+, XFP, Quad Small Form Pluggable (QSFP), QSFP+, etc. It is further appreciated that the XFP may be a DOM transceiver.

In some embodiments, a system includes a first network device configured to transmit information indicating transmitted optical power values of data transmitted from the first network device and a second network device configured to receive the information from the first network device. The second network device may be further configured to receive the data transmitted from the first network device. The second network device may be further configured to measure optical power values of the data transmitted from the first network device and received at the second network device. The second network device may be further configured to determine a baseline power value based on a subset of the recent optical power values and further based on the information transmitted from the first network device associated with the subset of the recent optical power values. The second network device may be further configured to generate a notification when a measured optical power value of data transmitted from the first network device and received at the second network device differs from the baseline power value by a threshold amount. The notification may indicate that a tampering of optical signals transmitted to the second network device has occurred.

It is appreciated that first and second network devices may be network switches. In some embodiments, the second network device comprises an optical module configured to measure the optical power values of the data transmitted from the first network device and received at the second network device. The optical module may be a digital diagnostic monitoring (DDM)-capable small form-factor pluggable (SFP) transceiver. In some embodiments, the threshold amount is a specified power value amount. In some embodiments, the threshold amount is a function of the baseline power value. The second network device may be further configured to determine the baseline power value based on an average of differences between transmitted optical power values and corresponding received optical power values. It is appreciated that other optical modules may be used, e.g., SFP+, XFP, Quad Small Form Pluggable (QSFP), QSFP+, etc. It is further appreciated that the XFP may be a DOM transceiver.

In some embodiments, a method receives from an optical module a plurality of optical power values measured at the optical module. The method also determines a baseline power value based on the plurality of optical power values. The method further generates a notification when an optical power value measured at the optical module differs from the baseline power value by a threshold amount. The notification may indicate that a tampering of optical signals transmitted to the optical module has occurred.

In some embodiments, the baseline power value may be determined by calculating an average of recent optical power values in the plurality of optical power values. The plurality of optical power values may be a first plurality of optical power values and the method further receives from the optical module a second plurality of optical power values measured by a network device. The optical module may receive the second plurality of optical power values from the network device. The determining of the baseline power may be further based on the second plurality of optical power values. The baseline power value may be determined by calculating an average of differences between the second plurality of optical power values and the first plurality of optical power values. In some embodiments, the notification is a first notification, the optical power value is a first optical power value, and the method further generates a second notification when a second optical power value falls within the threshold amount of the baseline power value.

These and various other features and advantages will be apparent from a reading of the following detailed description.

BRIEF DESCRIPTION OF DRAWINGS

The embodiments are illustrated by way of example, and not by way of limitation, in the figures of the accompanying drawings and in which like reference numerals refer to similar elements.

DETAILED DESCRIPTION

Reference will now be made in detail to various embodiments, examples of which are illustrated in the accompanying drawings. While various embodiments are described herein, it will be understood that these various embodiments are not intended to limit the scope of the embodiments. On the contrary, the embodiments are intended to cover alternatives, modifications, and equivalents, which may be included within the scope of the embodiments as construed according to the appended Claims. Furthermore, in the following detailed description of various embodiments, numerous specific details are set forth in order to provide a thorough understanding of the concept. However, it will be evident to one of ordinary skill in the art that the concept may be practiced without these specific details. In other instances, well known methods, procedures, components, and circuits have not been described in detail as not to unnecessarily obscure aspects of the concept and embodiments.

Some portions of the detailed descriptions that follow are presented in terms of procedures, logic blocks, processing, and other symbolic representations of operations on data bits within a computer memory. These descriptions and representations are the means used by those skilled in the data processing arts and data communication arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in an electronic device, a computer system or computing device. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "generating," "retrieving," "determining," "sending," "receiving," "transmitting," "communicating," "providing," "accessing," "polling," "using," "measuring" or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, etc. Embodiments described herein may be discussed in the general context of machine-executable instructions residing on some form of machine-readable storage medium, such as program modules, executed by one or more computers, computing devices, or other devices. By way of example, and not limitation, machine-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media can include volatile and nonvolatile, removable and non-removable media implemented in any method or technology for storage of information such as machine-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of machine-readable storage media.

Embodiments described herein are directed to network devices that include an optical module capable of measuring received optical power values. The network device determines a baseline power value and generates notifications when a received optical power value differs from the baseline power value by a threshold amount.

Figure 1A:
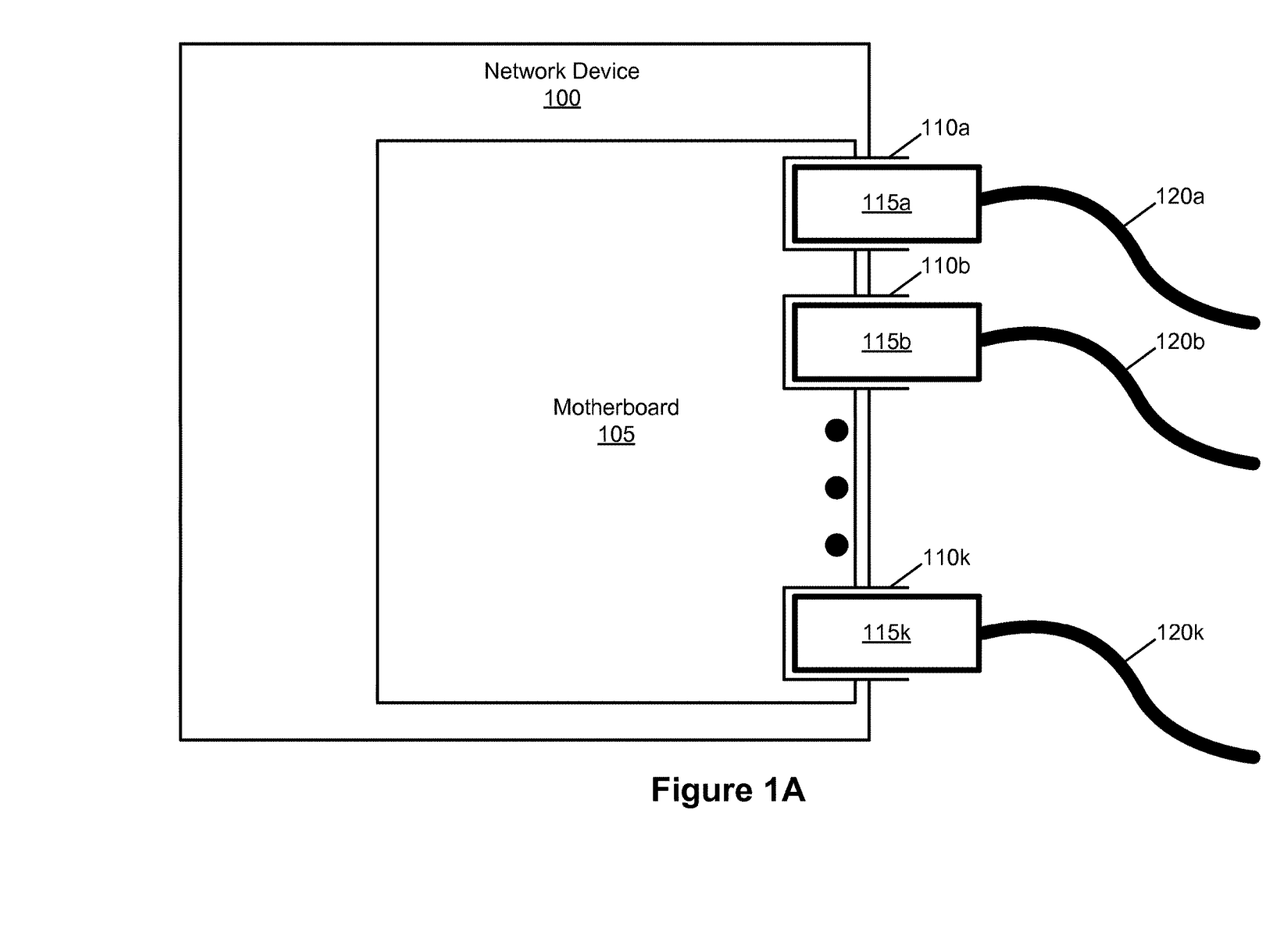
FIGS. 1A and 1B show a network device for detecting optical signal tampering in accordance with some embodiments.

Referring now to FIG. 1A, a network device 100 for detecting optical signal tampering is shown in accordance with some embodiments. As illustrated, the network device 100 includes a motherboard 105, which includes optical module interfaces 110a-k. The motherboard 105 may manage communication between the optical module interfaces 110a-k and other components (not shown) of the network device 100, e.g., processor(s), memory, etc. The optical module interfaces 110a-k may be electrical interfaces configured to accept optical modules 115a-k.

The optical modules 115a-k handle communication of optical signals through optical cables 120a-k. It is appreciated that the optical cables 120a-k may employ any number of different types of fiber (e.g., single-mode fiber, multi-mode fiber, etc.). In addition, the optical modules 115a-k may measure optical power values of received optical signals (which could include received optical power and transmitted optical power). The optical modules 115a-k are pluggable into the optical module interfaces 110a-k. As shown in FIG. 1, the optical modules 115a-k are plugged into, and coupled to, the corresponding optical module interfaces 110a-k. In some embodiments, the optical modules 115a-k are small form-factor pluggable (SFP) transceivers. It is appreciated that the optical modules 110a-k may be digital diagnostic monitoring (DDM)-capable SFP transceivers. It is appreciated that while embodiments described herein may refer to SFP and DDM transceivers, the embodiments should not be construed as limited thereto. For example, it is appreciated that other optical modules may be used, e.g., SFP+, XFP, Quad Small Form Pluggable (QSFP), QSFP+, etc. It is further appreciated that the XFP may be a DOM transceiver.

The network device 100 may be configured to communicate optical signals with other devices (not shown) coupled to the network device 100 via the optical cables 120a-k. In some embodiments, the network device 100 includes an optical signal-monitoring feature that is used to detect tampering of optical signals received by the optical modules 115a-k plugged in the network device 100. It is appreciated that while embodiments described throughout the application refer to detecting tampering, but embodiments should not be construed as limited to tampering. For example, the embodiments described herein also detect other noteworthy events such as damage to the cable or the possibility of tampering.

The network device 100 may employ different methodologies for detecting tampering of optical signals or other noteworthy events. For example, the network device 100 may determine a baseline optical power value associated with an optical module (e.g., one of the optical modules 115a-k) based on recent received optical power values (e.g., the most recent 5, 10, 12, 15, 20, 30, etc., received optical power values) measured by the optical module. The network device 100 may then detect a tampering of optical signals through the optical module when a received optical power value differs from, e.g., falls below, the baseline optical power value by a threshold amount. The network device 100 may determine the baseline optical power value as an average of the recent received optical power values measured at the optical module.

Figure 1B:
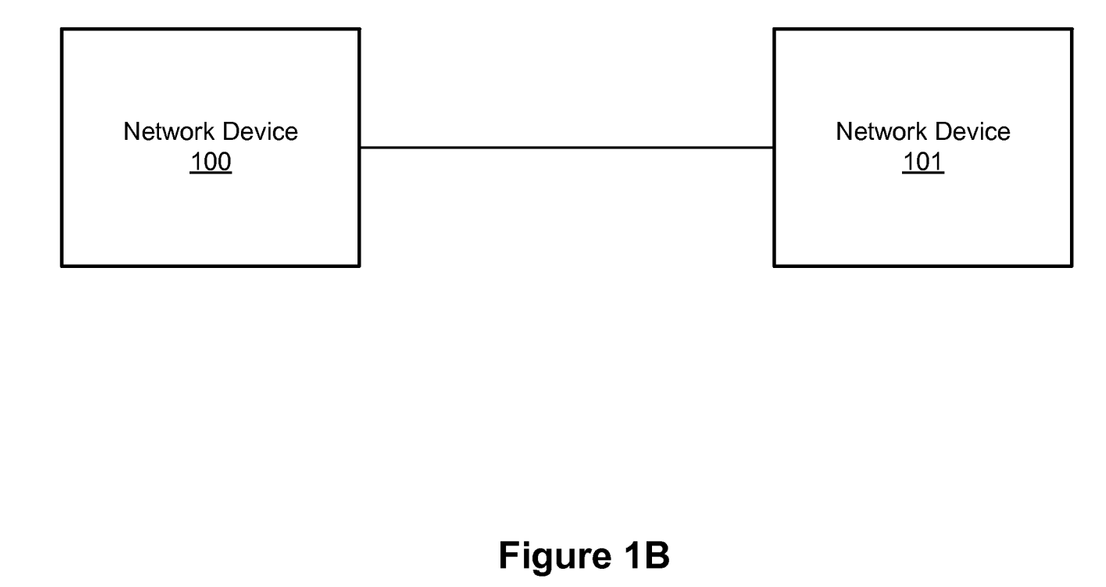

Referring to FIG. 1B as another example, the network device 100 may determine a baseline optical power value associated with an optical module (e.g., one of the optical modules 115a-k) based on recent received optical power values (e.g., the most recent 5, 10, 12, 15, 20, 30, etc., received optical power values) measured by the optical module and corresponding optical power values of optical signals, as measured by a network device 101, transmitted from a network device 101 to the network device 100 (also referred to as transmitted optical power values). The network device 100 may detect a tampering of optical signals through the optical module when a received optical power value differs from, e.g., falls below, the baseline optical power value by a threshold amount. In some embodiments, the network device 100 may determine the baseline optical power value as an average of the differences between recent received optical power values measured at the optical module and corresponding transmitted optical power values measured by the network device 101.

Figure 2:
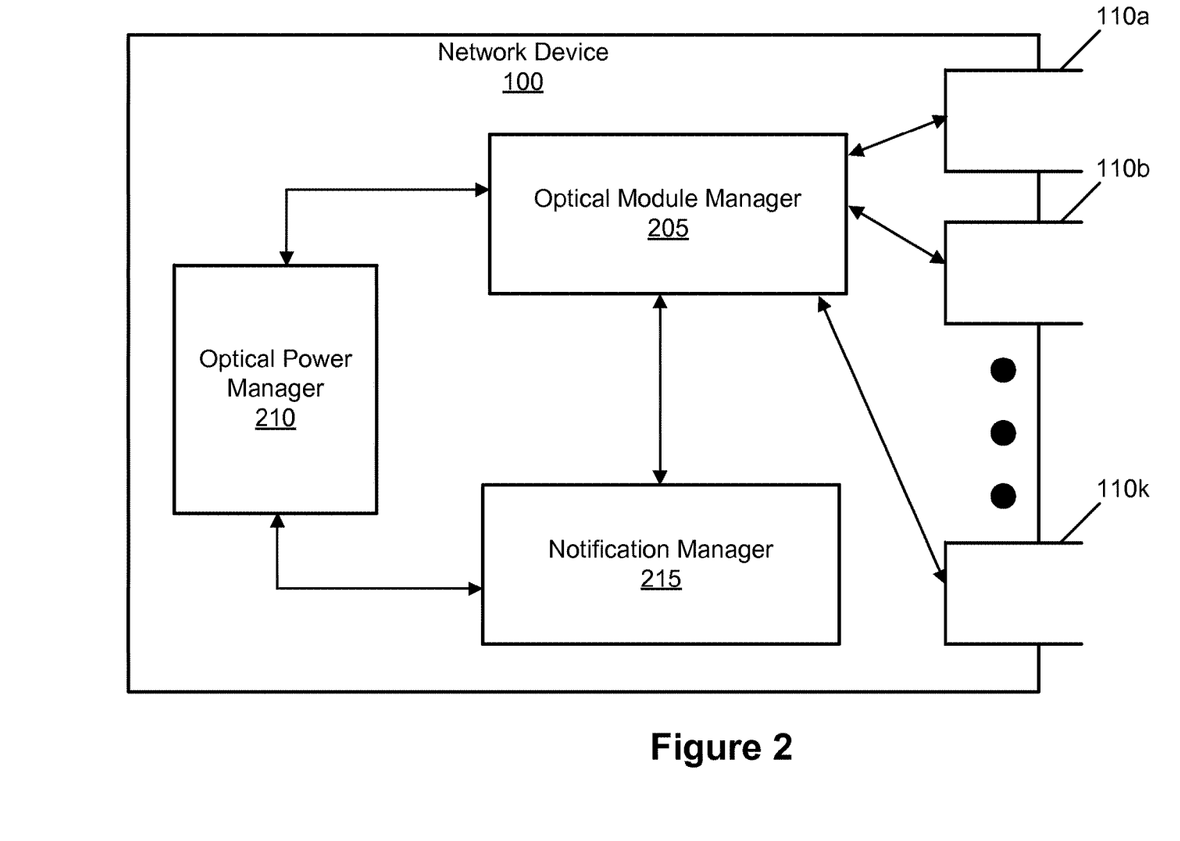
FIG. 2 shows an architecture of a network device for detecting optical signal tampering in accordance with some embodiments.

It is appreciated that the threshold amount may be different in different embodiments. For instance, in some embodiments, the threshold amount is a specified optical power value (e.g., 50 microwatts (uW), 100 uW, 150 uW, 200 uW, etc.). As another example, the threshold amount is a percentage (e.g., 2%, 5%, 10%, 15%, 20%, etc.) of the baseline optical power value in some embodiments In some embodiments, the optical power manager may be configured to determine a maximum achievable sensitivity for a link from the received optical power values. It is appreciated that the maximum sensitivity may be determined using the spread of measured values. Referring now to FIG. 2, an architecture of the network device 100 for detecting optical signal tampering is shown in accordance with some embodiments. As illustrated in FIG. 2, the network device 100 includes an optical module manager 205, an optical power manager 210, and a notification manager 215.

The optical module manager 205 may perform various functions in managing optical modules (e.g., the optical modules 115a-k) coupled to the network device 100 via the optical module interfaces 110a-k. For example, the optical module manager 205 may request an optical module coupled to the network device 100 to measure a received optical power value at the optical module. The optical module manager 205 may also instruct an optical module to measure a received optical power value at the optical module at a specified interval (e.g., 1 second, 2 seconds, 5 seconds, 10 seconds, 30 seconds, 1 minute, etc.), which may also be referred to as polling the optical module for received power values. Additionally, the optical module manager 205 may detect when an optical module is plugged into the network device 100 and when an optical module is unplugged from the network device 100.

The optical power manager 210 may be responsible for managing the baseline optical power values associated with the optical modules (e.g., one of the optical modules 115a-k) coupled to the network device 100. For instance, when the optical module manager 205 detects that an optical module is plugged into the network device 100, the optical module manager 205 instructs the optical power manager 210 to begin calculating a baseline optical power value associated with the optical module and/or the optical module interface in which the optical module is plugged. In addition, when the optical module manager 205 detects that an optical module is unplugged from the network device 100, the optical module manager 205 instructs the optical power manager 210 to reset the baseline optical power value associated with the optical module and/or the optical module interface in which the optical module is plugged.

Furthermore, the optical power manager 210 may determine a baseline optical power value associated with an optical module (e.g., one of the optical modules 115a-k) coupled to the network device 100. In some embodiments, the optical power manager 210 determines a baseline optical power value associated with an optical module based on recent received optical power values (e.g., the most recent 5, 10, 12, 15, 20, 30, etc., received optical power values) measured by the optical module. The recent received optical power values may be the most recent received optical power values within a specified period of time (e.g., the most recent received optical power values within the last 5 minutes, 15 minutes, 30 minutes, 1 hour, etc.). In some instances, the optical power manager 210 determines the baseline optical power value as an average of the recent received optical power values measured at the optical module. In other instances, the optical power manager 210 uses a specified optical power value as the baseline optical power value.

In some embodiments, the optical power manager 210 may determine a baseline optical power value associated with an optical module based on recent received optical power values (e.g., the most recent 5, 10, 12, 15, 20, 30, etc., received optical power values) measured by the optical module and corresponding transmitted optical power values measured by another network device that transmits optical signals to the network device 100. In some instances, the optical power manager 210 determines the baseline optical power value as an average of the differences between recent received optical power values measured at the optical module and corresponding transmitted optical power values measured by the other network device. In other instances, the optical power manager 210 uses a specified optical power value as the baseline optical power value.

The notification manager 215 handles detection of tampering of optical signals through an optical module and generation of notifications indicating such tampering. In some embodiments, the notification manager receives baseline optical power values associated with optical modules from the optical power manager 210 and received optical power values measured by the optical modules from the optical module manager 205. Based on the baseline optical power value associated with an optical module and a received optical power value measured by the optical module, the notification manager 215 determines that tampering of optical signals through the optical module may have occurred when the received optical power value differs from, e.g., falls below, the baseline optical power value by a threshold amount.

In some embodiments, the notification manager receives the baseline optical power value associated with the optical modules from the optical power manager 210 and it further receives the optical power value measured by the optical modules along with the optical power value that was measured by another network device, e.g., network device 101. The notification manager 215 determines that tampering of optical signals may have occurred if the difference between the received optical power value measured by the optical module and the optical value measured by other network device differs from, e.g., falls below, the baseline optical power value by a threshold amount.

In response to the determination of tampering or other noteworthy events, the notification manager 215 then generates a notification indicating that tampering of optical signals through the optical module may have occurred. In some embodiments, the notification includes a switch identifier for identifying the network switch that detected that tampering may have occurred and a port/interface identifier for identifying the port/interface on which the tampering may have occurred. It is appreciated that generating a notification may include any number of actions (e.g., sending a text message, sending an email, adding a log entry to a log file, sounding an alarm, SNMP notification, etc., or any combination thereof). It is appreciated that in some embodiments, a user configurable action may occur, e.g., the device can be configured to shutdown or reconfigure a port, etc. when tampering is detected.

After generating the notification indicating that tampering may have occurred, the notification manager 215 may generate another notification when a further received optical power value falls within the threshold amount of the baseline power value. In some embodiments, the notification includes a switch identifier for identifying the network switch and a port/interface identifier for identifying the port/interface on which the change has been detected. It is appreciated that generating a notification may include any number of actions (e.g., sending a text message, sending an email, adding a log entry to a log file, sounding an alarm, SNMP notification, etc., or any combination thereof). It is appreciated that in some embodiments, a user configurable action may occur, e.g., the device can be configured to shutdown or reconfigure a port, etc. when the change is detected.

It is appreciated that in some embodiments, a central server may perform one or more functionality of the components described above. For example, the central server may receive readings from one or more optical module managers via a protocol, e.g., SNMP, and may further perform the operations of the notification manager, optical manager, or any combination thereof.

Figure 3:
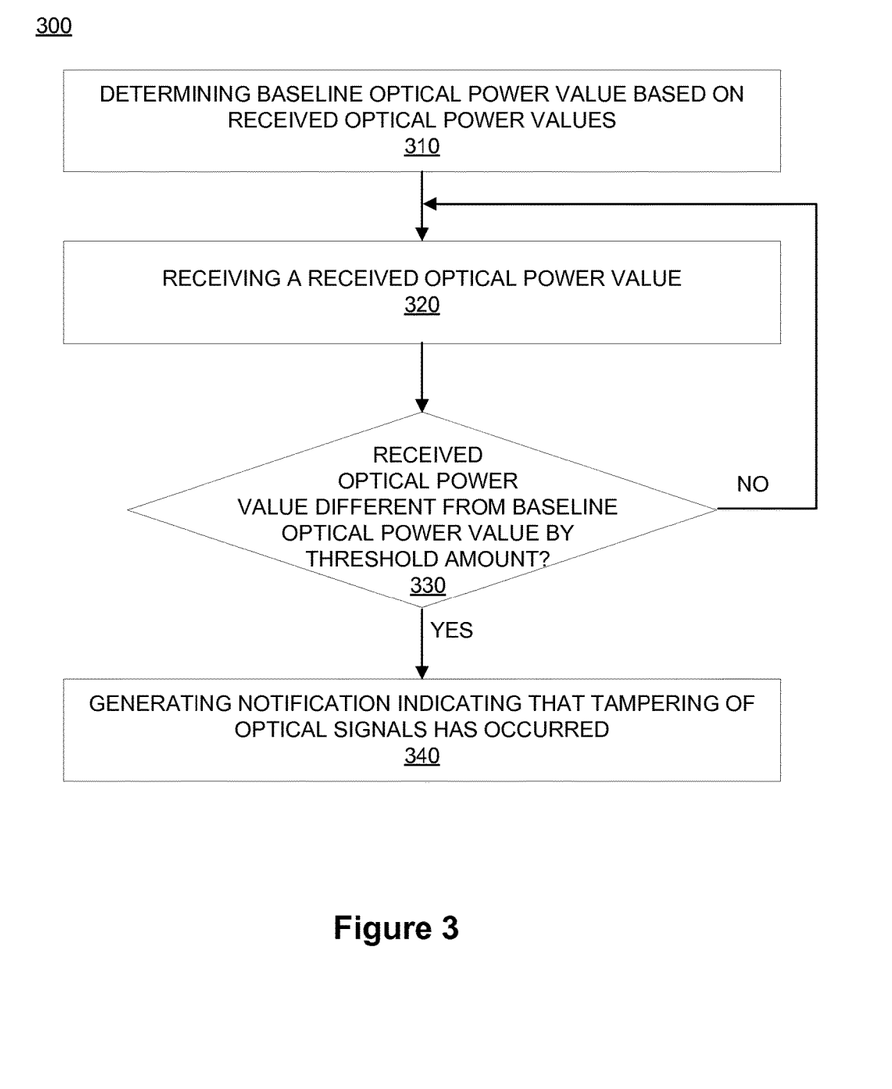
FIG. 3 shows a process for detecting optical signal tampering based on received optical power values in accordance with some embodiments.

FIG. 3 shows a process 300 for detecting optical signal tampering based on received optical power values in accordance with some embodiments. In some embodiments, a network device (e.g., the network device 100) performs the operations described in FIG. 3 when an optical module is plugged into the network device. At step 310, the network device determines a baseline optical power value based on received optical power values measured by an optical module. The received optical power values may be recent optical power values within a specified period of time (e.g., a user-specified period of time, a preconfigured period of time, etc.). In some embodiments, the network device determines the baseline optical power value as an average of the recent received optical power values. The network device may use a specified optical power value (e.g., a user-specified optical power value, a preconfigured optical power value, etc.) as the baseline optical power value.

At step 320, the network device receives a received optical power value measured by the optical module. In some embodiments, the network device may request the optical module to measure the received optical power value and, in response, receives the received optical power value. At step 330, the network device determines whether the received optical power value differs from, e.g., falls below, the baseline optical power level by a threshold amount. In some instances, the threshold amount is a specified optical power value (e.g., a user-specified optical power value, a preconfigured optical power value, etc.) while, in other instances, the threshold amount is a percentage of the baseline optical power value, or some other function of the data. If the network device determines that the received optical power value does not differ from the baseline optical power value by the threshold amount, the network device returns to step 320.

If the network device determines that the received optical power value differs from, e.g., falls below the baseline optical power value by the threshold amount, the network device generates, at step 340, a notification indicating that tampering of optical signals through the optical module may have occurred. It is appreciated that generating a notification may include any number of actions (e.g., sending a text message, sending an email, adding a log entry to a log file, sounding an alarm, SNMP notification, etc., or any combination thereof). It is appreciated that in some embodiments, a user configurable action may occur, e.g., the device can be configured to shutdown or reconfigure a port, etc. when the change is detected.

Figure 4:
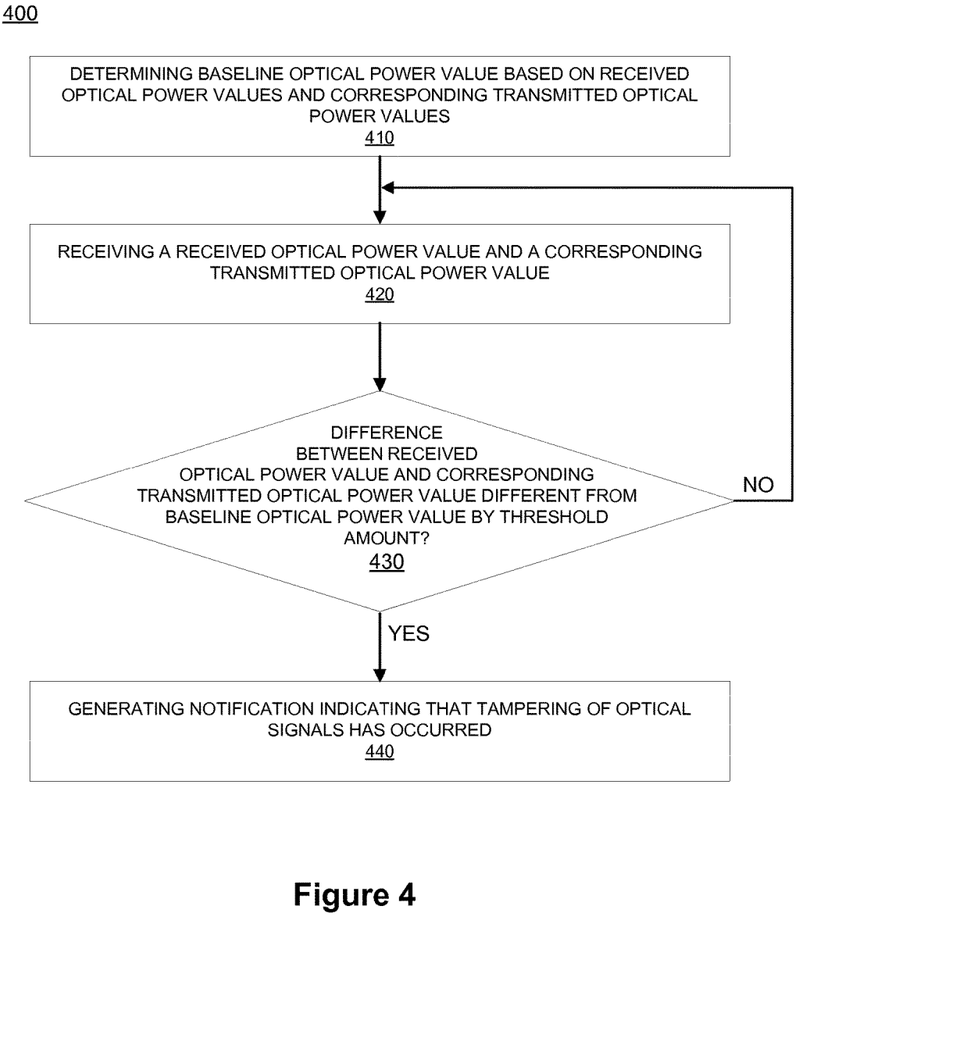
FIG. 4 shows a process for detecting optical signal tampering based on received optical power values and transmitted optical power values in accordance with some embodiments.

FIG. 4 shows a process 400 for detecting optical signal tampering based on received optical power values and transmitted optical power values in accordance with some embodiments. In some embodiments, a network device (e.g., the network device 100) performs the operations described in FIG. 4 when an optical module is plugged into the network device. At step 410, the network device determines a baseline optical power value based on received optical power values, as measured by an optical module, and further based on corresponding transmitted optical power values, as measured by a device (e.g., the network device 101) separate from the network device that transmits optical signals to the network device. The received optical power values may be recent optical power values within a specified period of time (e.g., a user-specified period of time, a preconfigured period of time, etc.). In some embodiments, the network device determines the baseline optical power value as an average of the differences between recent received optical power values measured at the optical module and corresponding transmitted optical power values measured by the other network device. The network device may use a specified optical power value as the baseline optical power value.

At step 420, the network device receives a received optical power value measured, e.g., by the optical module, and a corresponding transmitted optical power value, e.g., as measured by other network device 101. The received optical power value may be measured by the optical module while the corresponding transmitted optical power value may be measured by the device that transmits optical signals to the network device. In some embodiments, the network device instructs the optical module to measure the received optical power value and, in response, receives the received optical power value.

At step 430, the network device determines whether the difference between the received optical power value and the corresponding transmitted optical power value differs from, e.g., falls below, the baseline optical power level by a threshold amount. In some instances, the threshold amount is a specified optical power value while, in other instances, the threshold amount is a percentage of the baseline optical power value. If the network device determines that the difference does not differ from the baseline optical power value by the threshold amount, the network device returns to step 420.

If the network device determines that the difference differs from, e.g., falls below, the baseline optical power value by the threshold amount, the network device generates, at step 440, a notification indicating that tampering of optical signals through the optical module may have occurred. It is appreciated that generating a notification may include any number of actions (e.g., sending a text message, sending an email, adding a log entry to a log file, sounding an alarm, SNMP notification, etc., or any combination thereof). It is appreciated that in some embodiments, a user configurable action may occur, e.g., the device can be configured to shutdown or reconfigure a port, etc. when the change is detected.

FIGS. 1-4 show a network device (e.g., the network device 100) that performs various functions for detecting tampering of optical signals. It is appreciated that some or all of the functions may be implemented in a different device. For example, the functions may be implemented in each optical module (e.g., each of the optical modules 115a-k) that is coupled to the network device. In some embodiments, some of the functions (e.g., the baseline optical power value determination, the tampering detection, the notification generation, etc.) may be implemented in a separate device (e.g., a computer, a server, a laptop, etc.) that communicates with the network device.

Figure 5:
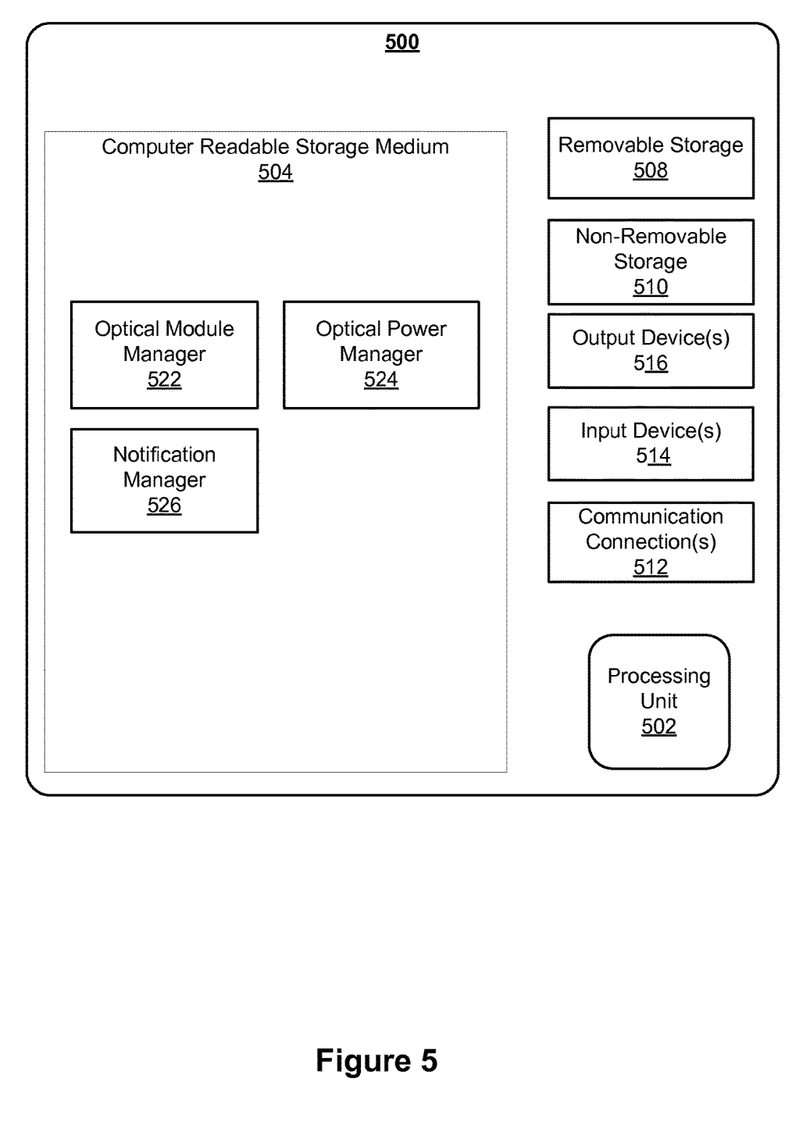
FIG. 5 shows a computer system in accordance with some embodiments.

Referring now to FIG. 5, a block diagram of a computer system in accordance with some embodiments is shown. With reference to FIG. 5, a system module for implementing embodiments includes a general purpose computing system environment, such as computing system environment 500. Computing system environment 500 may include, but is not limited to, servers, switches, routers, desktop computers, laptops, tablets, mobile devices, and smartphones. In its most basic configuration, computing system environment 500 typically includes at least one processing unit 502 and machine readable storage medium 504. Depending on the exact configuration and type of computing system environment, machine readable storage medium 504 may be volatile (such as RAM), non-volatile (such as ROM, flash memory, etc.) or some combination of the two. Additionally, in various embodiments, computing system environment 500 may also have other features/functionality. For example, computing system environment 500 may also include additional storage (removable and/or non-removable) including, but not limited to, magnetic or optical disks or tape. Such additional storage is illustrated by removable storage 508 and non-removable storage 510. Computer storage media includes volatile and nonvolatile, removable and non-removable media implemented in any method or technology for storage of information such as machine readable instructions, data structures, program modules or other data. Machine readable medium 504, removable storage 508 and nonremovable storage 510 are all examples of computer storage media. Computer storage media includes, but is not limited to, RAM, ROM, EEPROM, flash memory or other memory technology, expandable memory (e.g., USB sticks, compact flash cards, SD cards), CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 500. Any such computer storage media may be part of computing system environment 500.

In some embodiments, computing system environment 500 may also contain communications connection(s) 512 that allow it to communicate with other devices. Communications connection(s) 512 is an example of communication media. Communication media typically embodies machine readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term machine readable media as used herein includes both storage media and communication media.

Communications connection(s) 512 may allow computing system environment 500 to communicate over various networks types including, but not limited to, fibre channel, small computer system interface (SCSI), Bluetooth, Zigbee, Z-Wave, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 512 connect to may run a plurality of network protocols including, but not limited to, transmission control protocol (TCP), user datagram protocol (UDP), internet protocol (IP), real-time transport protocol (RTP), real-time transport control protocol (RTCP), file transfer protocol (FTP), and hypertext transfer protocol (HTTP).

In further embodiments, computing system environment 500 may also have input device(s) 514 such as keyboard, mouse, a terminal or terminal emulator (either connected or remotely accessible via telnet, SSH, http, SSL, etc.), pen, voice input device, touch input device, remote control, etc. Output device(s) 516 such as a display, a terminal or terminal emulator (either connected or remotely accessible via telnet, SSH, http, SSL, etc.), speakers, light emitting diodes (LEDs), etc. may also be included. All these devices are well known in the art and are not discussed at length.

In one embodiment, machine readable storage medium 504 includes an optical module manager 522, an optical power manager 524, and a notification manager 526. The optical module manager 522 is operable to manage optical modules coupled to a network device in accordance with the processes 300 and 400, for example. The optical power manager 524 may be used to determine baseline optical power values in accordance with processes 300 and 400, for example. The notification manager 526 operates to determine potential tampering of optical signals and generate notifications indicating such tampering in accordance with the processes 300 and 400, for example.

It is appreciated that implementations according to some embodiments that are described with respect to a computer system are merely exemplary and not intended to limit the scope of the embodiments. For example, some embodiments may be implemented on devices such as switches and routers, which may contain application specific integrated circuits (ASICs), field programmable gate arrays (FPGAs), etc. It is appreciated that these devices may include a machine readable medium for storing instructions for implementing methods according to processes 300 and 400.

Figure 6:
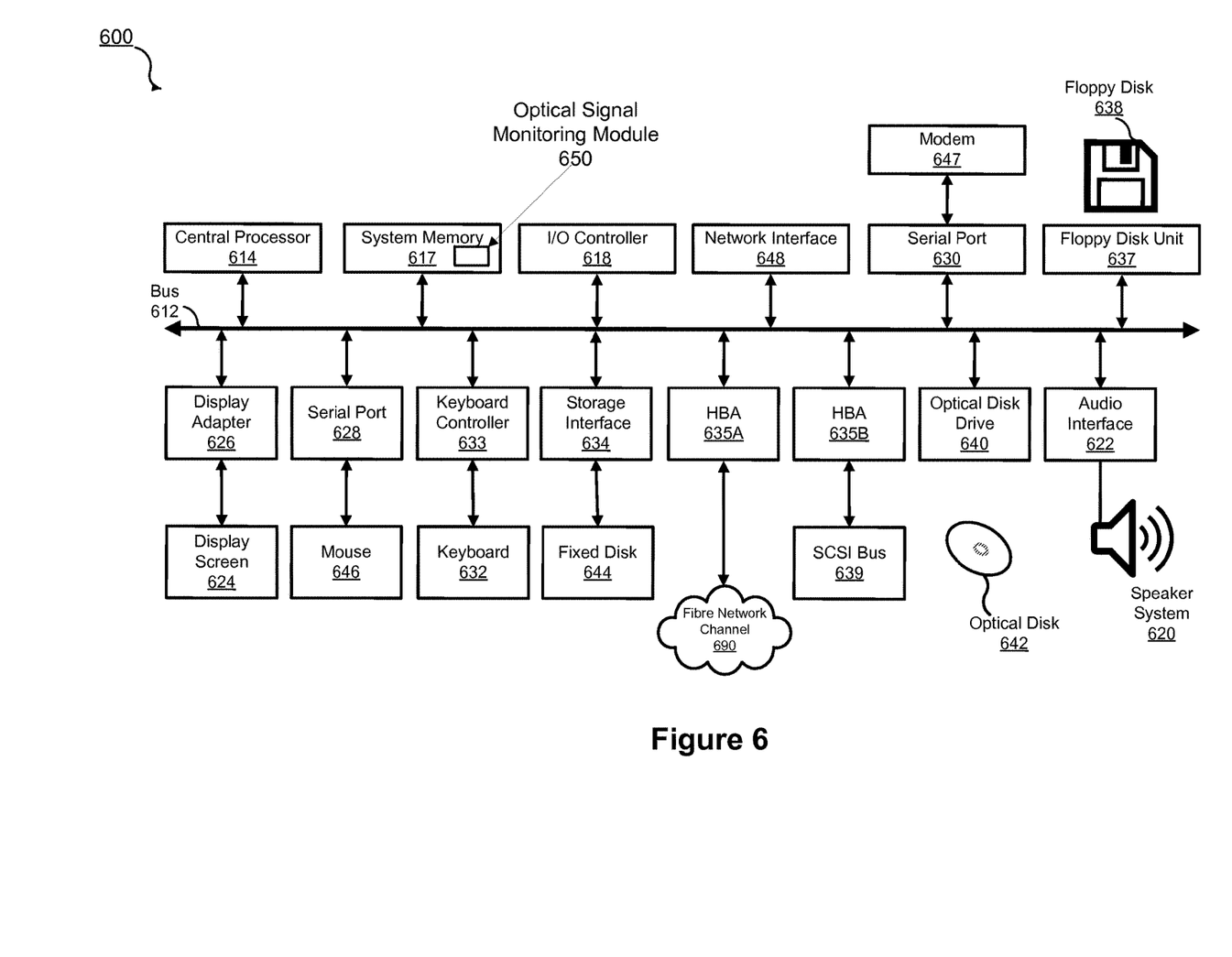
FIG. 6 shows a block diagram of a computer system in accordance with some embodiments.

Referring now to FIG. 6, a block diagram of another exemplary computer system in accordance with some embodiments is shown. FIG. 6 depicts a block diagram of a computer system 610 suitable for implementing the present disclosure. Computer system 610 includes a bus 612 which interconnects major subsystems of computer system 610, such as a central processor 614, a system memory 617 (typically RAM, but which may also include ROM, flash RAM, or the like), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), a storage interface 634, a floppy disk drive 637 operative to receive a floppy disk 638, a host bus adapter (HBA) interface card 635A operative to connect with a Fibre Channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612). It is appreciated that the network interface 648 may include one or more Ethernet ports, wireless local area network (WLAN) interfaces, Bluetooth interfaces, Zigbee interfaces, Z-Wave interfaces, etc., but are not limited thereto. System memory 617 includes an optical signal-monitoring module 650 which is operable to monitor optical signals in order to detect tampering of the optical signals. According to one embodiment, the optical signal-monitoring module 650 may include other modules for carrying out various tasks. For example, the optical signal-monitoring module 650 may include the optical module manager 522, the optical power manager 524, and the notification manager 526, as discussed with respect to FIG. 5 above. It is appreciated that the optical signal-monitoring module 650 may be located anywhere in the system and is not limited to the system memory 617. As such, residing of the optical signal-monitoring module 650 within the system memory 617 is merely exemplary and not intended to limit the scope of the embodiments. For example, parts of the optical signal-monitoring module 650 may reside within the central processor 614 and/or the network interface 648 but are not limited thereto.

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 610 are generally stored on and accessed via a machine readable medium, such as a hard disk drive (e.g., fixed disk 644), an optical drive (e.g., optical drive 640), a floppy disk unit 637, or other storage medium. Additionally, applications can be in the form of electronic signals modulated in accordance with the application and data communication technology when accessed via network modem 647 or interface 648.

Storage interface 634, as with the other storage interfaces of computer system 610, can connect to a standard machine readable medium for storage and/or retrieval of information, such as a fixed disk drive 644. Fixed disk drive 644 may be a part of computer system 610 or may be separate and accessed through other interface systems. Network interface 648 may provide multiple connections to other devices. Furthermore, modem 647 may provide a direct connection to a remote server via a telephone link or to the Internet via an internet service provider (ISP). Network interface 648 may provide one or more connection to a data network, which may include any number of networked devices. It is appreciated that the connections via the network interface 648 may be via a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 6 need not be present to practice the present disclosure. The devices and subsystems can be interconnected in different ways from that shown in FIG. 6. The operation of a computer system such as that shown in FIG. 6 is readily known in the art and is not discussed in detail in this application. Code to implement the present disclosure can be stored in machine-readable storage media such as one or more of system memory 617, fixed disk 644, optical disk 642, or floppy disk 638. The operating system provided on computer system 610 may be MS-DOS®, MS-WINDOWS®, OS/2®, UNIX®, Linux®, or any other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing description, for purpose of explanation, has been described with reference to specific embodiments. However, the illustrative discussions above are not intended to be exhaustive or to limit the embodiments disclosed. Many modifications and variations are possible in view of the above teachings.

What is claimed is:

1. A device comprising:
   an optical module manager configured to poll an optical module coupled to the device for received optical power values, wherein the optical module manager is further configured to receive a received optical power value;
   an optical power manager configured to determine a baseline power value based on a plurality of optical power values measured by the optical module; and
   a notification manager configured to generate a notification when the received optical power value differs from the baseline power value by a threshold amount, wherein the notification indicates occurrence of an event selected from a group consisting of a tampering of optical signals transmitted to the device, or damage to a cable.

2. The device as described in claim 1, wherein the optical power manager is further configured to determine the baseline power value based on an average of a plurality of recent received optical power values.

3. The device as described in claim 1, wherein the optical power manager is further configured to determine the baseline power value by using a specified power value as the baseline power value.

4. The device as described in claim 1, wherein the optical module is a small form-factor pluggable (SFP) transceiver.

5. The device as described in claim 4, wherein the SFP transceiver is a digital diagnostic monitoring (DDM)-capable SFP transceiver.

6. The device as described in claim 1, wherein the threshold amount is a specified power value amount.

7. The device as described in claim 1, wherein the threshold amount is a function of the baseline power value.

8. A system comprising:
   a first network device configured to transmit information indicating transmitted optical power values of data transmitted from the first network device; and
   a second network device configured to receive the information from the first network device, wherein the second network device is further configured to receive the data transmitted from the first network device, wherein the second network device is further configured to measure optical power values of the data transmitted from the first network device and received at the second network device, wherein the second network device is further configured to determine a baseline power value based on a subset of the recent optical power values and further based on the information transmitted from the first network device associated with the subset of the recent optical power values, wherein the second network device is further configured to generate a notification when a difference between a measured received optical power value and the transmitted information received from the first network device associated with the transmitted optical power values differs from the baseline power value by a threshold amount, wherein the notification indicates occurrence of an event selected from a group consisting of a tampering of optical signals transmitted to the second network device or a damage to a cable.

9. The system as described in claim 8, wherein the first and second network devices are network switches.

10. The system as described in claim 8, wherein the second network device comprises an optical module configured to measure the optical power values of the data transmitted from the first network device and received at the second network device.

11. The system as described in claim 10, wherein the optical module is a digital diagnostic monitoring (DDM)-capable small form-factor pluggable (SFP) transceiver.

12. The system as described in claim 8, wherein the threshold amount is a specified power value amount.

13. The system as described in claim 8, wherein the threshold amount is a function of the baseline power value.

14. The system as described in claim 8, wherein the second network device is further configured to determine the baseline power value based on an average of differences between received transmitted optical power values and corresponding received optical power values.

15. A method comprising:
   receiving from an optical module a plurality of optical power values measured at the optical module;
   determining a baseline power value based on the plurality of optical power values; and
   generating a notification based on an optical power value measured at the optical module, the baseline power value, and further based on a threshold amount, wherein the notification indicates occurrence of an event consisting of a tampering of optical signals transmitted to the optical module or a damage to a cable.

16. The method as described in claim 15, wherein the baseline power value is determined by calculating an average of recent optical power values in the plurality of optical power values.

17. The method as described in claim 15, wherein the notification is generated when a difference between the optical power value measured at the optical module differs from the baseline power value by the threshold amount.

18. The method as described in claim 15, wherein the plurality of optical power values is a first plurality of optical power values, the method further comprising receiving from the optical module a second plurality of optical power values measured by a network device, wherein the optical module receives the second plurality of optical power values from the network device.

19. The method as described in claim 18, wherein the determining of the baseline power is further based on the second plurality of optical power values.

20. The method as described in claim 19, wherein the baseline power value is determined by calculating an average of differences between the second plurality of optical power values and the first plurality of optical power values, and wherein the notification is generated when a difference of the optical power value measured at the optical module and a measured optical power value by the network device differs from the baseline power value by a threshold amount.

21. The method as described in claim 15, wherein the notification is a first notification, wherein the optical power value is a first optical power value, the method further comprising generating a second notification when a second optical power value falls within the threshold amount of the baseline power value.

22. The method as described in claim 15 further comprising:
    shutting down a port in response to the detected tampering.

23. The method as described in claim 15 further comprising:
    reconfiguring a port in response to the detected tampering.

* * * * *